United States Patent [19]
Zatorsky, Jr.

[11] 3,735,489
[45] May 29, 1973

[54] HAND-HELD POWER TOOL WITH ROTARY TOOL DISC AT END OF REVERSIBLE FORWARDLY PROJECTING ARM

[75] Inventor: Nicholas Ignatius Zatorsky, Jr., Greenwich, Conn.

[73] Assignee: Textron, Inc., Providence, R.I.

[22] Filed: Feb. 18, 1971

[21] Appl. No.: 116,333

[52] U.S. Cl. .................................... 30/390, 30/296
[51] Int. Cl. ................................................ B27b 9/00
[58] Field of Search ............... 143/32 R, 32 B, 43 R, 143/43 A, 32 L, 32 M; 30/390, 388, 296, 264

[56] References Cited

UNITED STATES PATENTS

| | | | |
|---|---|---|---|
| 3,583,106 | 6/1971 | Dobbertin | 143/43 A X |
| 3,435,859 | 4/1969 | Walker | 143/32 J |
| 2,783,794 | 3/1957 | Kroll | 143/32 M X |
| 3,513,888 | 5/1970 | Townsend et al. | 143/43 R |
| 3,469,313 | 9/1969 | Martin | 143/43 R X |

FOREIGN PATENTS OR APPLICATIONS

| | | | |
|---|---|---|---|
| 1,334,753 | 7/1963 | France | 143/32 M |

Primary Examiner—Andrew R. Juhasz
Assistant Examiner—James F. Coan
Attorney—Robert E. Burns

[57] ABSTRACT

A hand-held power tool has a circular saw or other disc-shaped tool at the forward end of an arm projecting forwardly from the one side of the engine chassis. The arm is reversible so that the tool disc can be positioned either directly ahead of the engine chassis for normal use or at one side for cutting close to an obstruction. In both positions the tool disc is driven by a belt from a drive pulley on the engine drive shaft.

11 Claims, 9 Drawing Figures

PATENTED MAY 29 1973 3,735,489

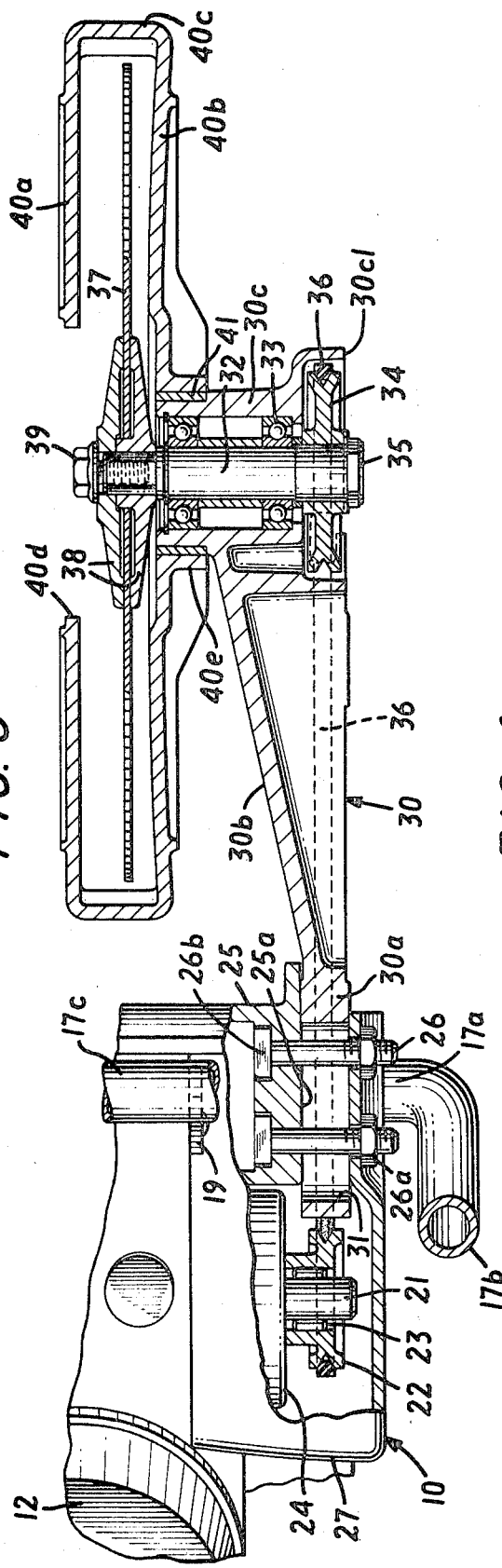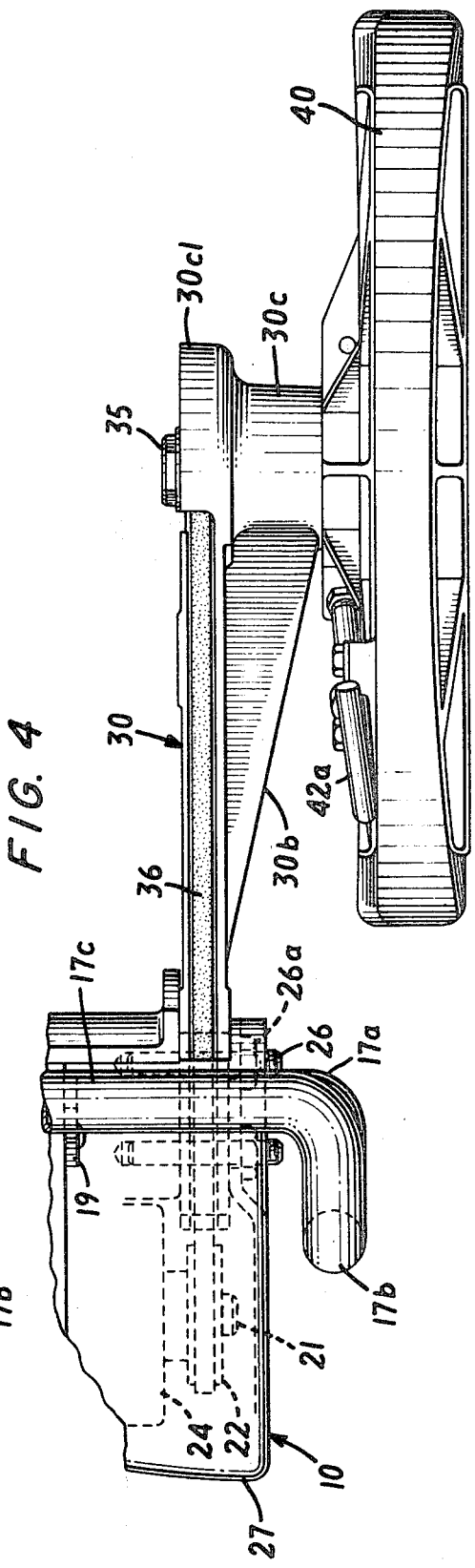

HAND-HELD POWER TOOL WITH ROTARY TOOL DISC AT END OF REVERSIBLE FORWARDLY PROJECTING ARM

The present invention relates to a hand-held power tool and in particular to a motor-driven tool having a rotating disc-shaped cutting or grinding tool. The tool may, for example, be a circular saw, a cutting wheel or disc or a grinding wheel or disc. Such tools are herein referred to for convenience and without limitation as tool discs.

The motor for driving the tool is preferably a light weight, high speed, two-cycle internal combustion engine having a laterally disposed output drive shaft. The engine chassis is provided with handles for holding the power tool, for example a forward handle for one hand of the operator and a rear handle for the other. Suitable controls are provided for starting and operating the engine, preferably including a throttle trigger associated with the rear handle for controlling the speed of the engine.

In accordance with the invention, the tool disc is rotatably mounted on an arm that extends forwardly from one side of the engine chassis and is mounted on the chassis selectively in one of two positions. In one position of the arm, the saw or other tool disc is directly in front of the engine with its plane of rotation approximately bisecting the engine chassis. This is the preferred position for normal use of the tool. In the other position, the tool disc is disposed forwardly and laterally of the engine with its plane of rotation offset laterally of the engine chassis. This position is useful, for example, when it is desired to cut or grind close to an obstruction. The arm is mounted in such manner on the chassis that it can be readily changed from one position to the other. In both positions of the arm the tool disc is driven in like manner from a driving pulley on the output drive shaft of the engine by a belt which is guided and protected by the arm.

The saw blade or other tool disc is partially enclosed by a guard which is rotatably mounted on the forward end of the arm coaxially with the tool disc and provided with means for securing it in any selected angular position. The guard can thus be readily positioned according to the nature of the work and the position of the work piece and when the arm is changed from one position to the other, the guard can be rotated approximately 180° to position it correctly for the new position of the arm and tool disc.

The nature, objects and advantages of the invention will be more fully understood from the following description in conjunction with the accompanying drawings in which:

FIG. 3 is a section taken approximately on the line 3—3 in FIG. 1 showing the arm and tool disc in one position;

FIG. 4 is a partial plan showing the arm and tool disc in another position;

Figure 1:
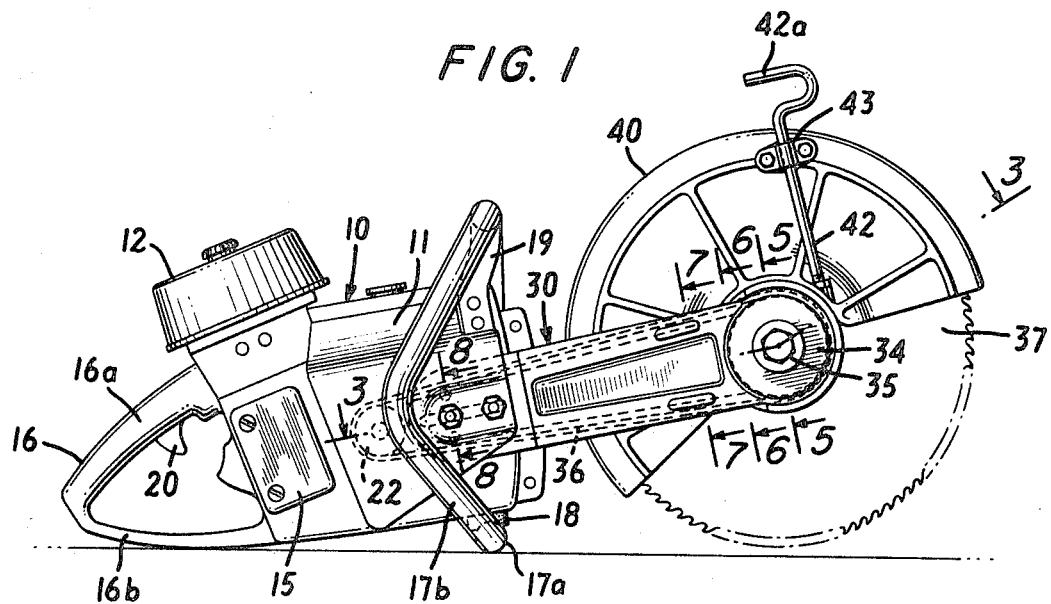
FIG. 1 is a right side view of a hand-held power tool in accordance with the invention.
Figure 2:
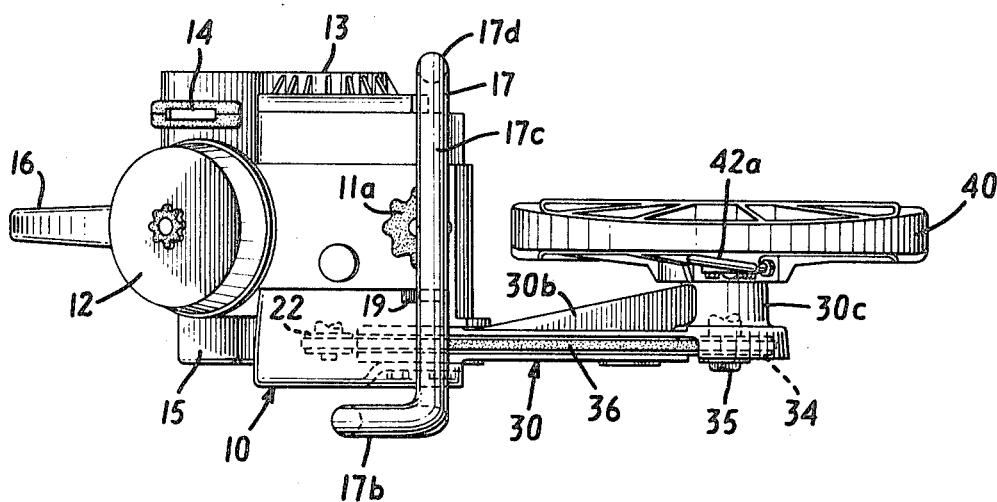
FIG. 2 is a plan.
Figure 5:
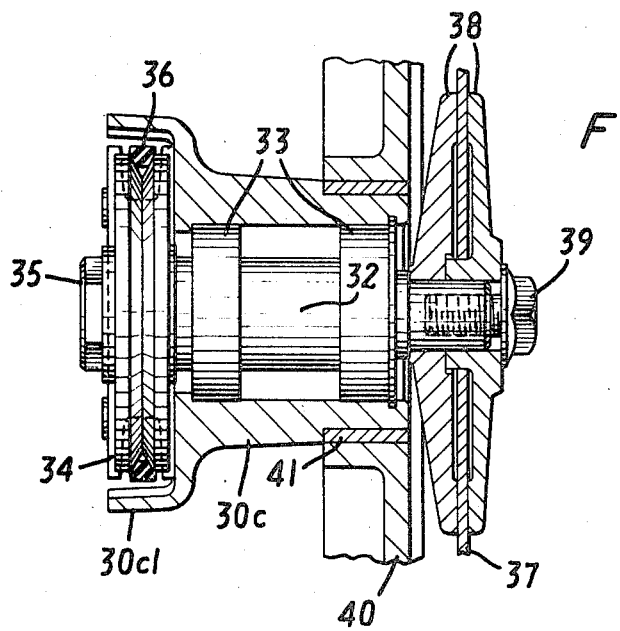
Figure 6:
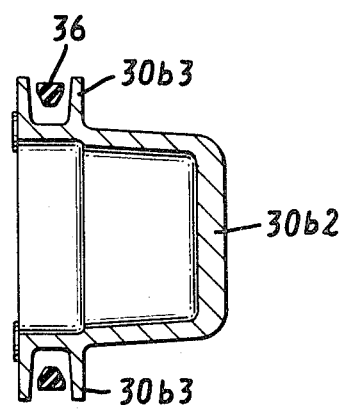
Figure 7:
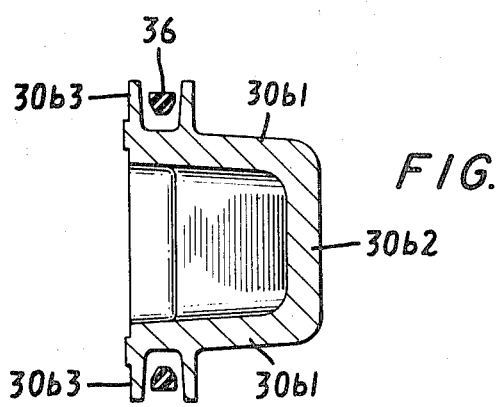
Figure 9:
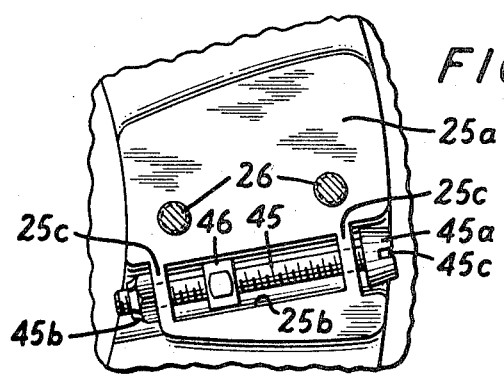
Figure 8:
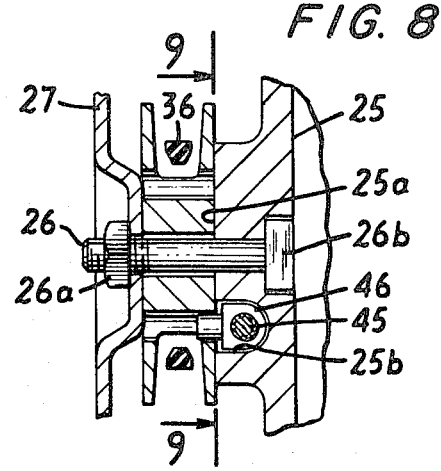

FIGS. 5, 6, 7 and 8 are cross-sections taken approximately on the lines 5—5, 6—6, 7—7 and 8—8 in FIG. 1, and FIG. 9 is a detail view taken approximately on the line 9—9 in FIG. 8.

The hand-held power tool shown by way of example in the drawings comprises a motor 10 which is illustrated as a light weight, high speed, two-cycle internal combustion engine of the type used for chain saws. The engine comprises a chassis and the usual operating parts of which internal parts such as a cylinder, piston, crank shaft and connecting rod are not shown in the drawings. External parts which are shown in the drawings include a fuel tank 11 having a removable cap 11a, an intake filter 12, cooling air intake grill 13, starter cord handle 14 and exhaust muffler 15. Handles provided for holding the power tool comprise a rear handle 16 and a front handle 17. The rear handle has a pistol grip portion 16a and a lower guard portion 16b. The front handle 17 comprises a tubular member substantially surrounding the front end portion of the engine chassis and having a bottom portion 17a secured to the bottom of the engine by a support 18, a right side portion 17b extending up alongside and spaced from the right side of the engine, a top portion 16c extending across and spaced from the top of the engine and a left hand portion 17d extending down alongside and spaced from the left side of the engine. In addition to the support 18, the front handle is secured to the engine by a bracket 19 extending up at the right side of the engine. As seen in FIG. 1, the right hand portion of the front handle is bent rearwardly in the form of a shallow V.

Suitable controls are provided for starting and operating the engine. In addition to the starter handle 14, the engine is provided with a trigger-like throttle control member 20 associated with the rear handle 16 so that it can be operated by a finger of the operator's hand holding the rear handle. The speed of the engine is thereby readily controlled.

The engine 10 has an output drive shaft 21 projecting at the right side of the engine. A driving pulley 22 is rotatably mounted on the shaft 21 by a bearing 23 and is releasably connected to the shaft by a centrifugal clutch 24. When the engine is running at idling speed, the centrifugal clutch 24 is disengaged so that the pulley 22 does not rotate. When the engine speed increases to a selected critical value, the centrifugal clutch 24 engages so that the driving pulley 22 rotates with the shaft 21.

Forwardly of the drive shaft 21 the engine chassis is provided with a support portion 25 for an arm 30 which extends forwardly from the right side of the engine chassis. The arm 30 comprises a rear end portion 30a, an intermediate portion 30b and a hub portion 30c which projects laterally to one side of the arm with its axis perpendicular to the arm and thus parallel to the drive shaft 21. The rear end portion 30a is essentially flat and is provided with a central, longitudinally extending elongated opening 31. The arm is removably secured to the engine chassis by two bolts 26 which extend through holes in the support portion 25 of the chassis, through the elongated opening 31 in the rear end portion of the arm 30 and through holes in a cover 27 which covers the end portion of the drive shaft 21, the pulley 22 and the centrifugal clutch 24. The bolts are press-fitted into the holes in the support portion 25 and have square heads 26b which are recessed in the inner side of the support portion. The outer end portions of the bolts 26 are threaded to receive nuts 26a. When the nuts 26a on the bolts 26 are tightened, the flat rear end portion of the arm 30 is clamped between the cover 26 and an essentially flat surface 25a of the support portion 25 of the chassis thereby securing the arm 30 in fixed position on the chassis.

As seen in FIGS. 3, 4, 6 and 7 the intermediate portion 30b of the arm 30 is of channel shaped cross section comprising opposite flanges 30b1 connected by an integral web portion 30b2. The depth of the channel increases progressively from the rear where it is equal to the thickness of the rear end portion 30a of the arm to the front where it merges into the hub portion 30c.

A shaft 32 is rotatably mounted inside the hub portion 30c of the arm by axially spaced ball bearings 33. A driven pulley 34 is fixed on one end of the shaft 32 by being pressed against a shoulder formed by an integral end portion 35 of the shaft having a hexagonal periphery. As seen in FIG. 3, the pulley 34 is in alignment with the driving pulley 22 from which it is driven by a belt 36. The belt is a highly flexible, high tensile strength belt of trapezoidal cross section with its sides inclined at an angle of approximately 60° to the inner and outer flat faces. The belt is of sufficiently small cross section nd sufficiently flexible to be able to pass around pulleys of small diameter. The driving pulley 22 is of smaller diameter than the driven pulley 34 so as to effect a speed reduction. Upper and lower runs of the belt are received in outwardly opening channels 30b3 provided on the outer faces of the flanges 30b1 of the intermediate channel section 30b of the arm 30 whereby they are guided and protected. Moreover, the pulley 34 is surrounded and protected by a flange 30c1 of the hub portion 30c.

On a reduced portion at the opposite end of the shaft 32, a tool disc 37 is removably mounted by means of flanged collars 38 and a bolt 39. The tool disc 37 may, for example, be a circular saw blade as illustrated in FIG. 1, a grinding disc or wheel or an abrasive cutting wheel of the kind used for cutting plastics or metal. When the bolt 39 is tightened, the collars 38 are squeezed between the bolt and a shoulder on the shaft 32, thereby clamping the disc 37 between them. The hexagonal end portion 35 at the pulley end of the shaft 32 provides a wrench section for holding the shaft when the bolt 39 is tightened or loosened.

The tool disc 37 is partially enclosed by a guard 40. As viewed in side elevation (FIG. 1), the guard is of arcuate shape with a circumferential extent of somewhat more than 180°. As viewed in radial section (FIG. 3), the guard 40 is of U-shaped cross section comprising a front portion 40a, a back portion 40b and a connecting circumferential portion 40c. The front portion 40a has a central opening 40d through which the bolt 39 is accessible. The guard 40 is rotatably mounted by means of a flange portion 40e on a circular portion 30c2 of the hub 30c so that the guard can be rotated to any desired angular position with respect to the hub. The guard 40 can be secured in any desired angular position by means of an arcuate clamping band 41 which is secured at one end to the flange portion 40e of the guard and can be tightened by means of a screw 42 which screws into a tapped hole at the other end of the clamp, has a handle portion 42a extending out beyond the periphery of the guard and rotatably mounted on the guard by means of a bracket 43.

Means is provided for positioning the arm 30 longitudinally with respect to the engine chassis so as to provide proper tension on the belt 36. The belt tensioning means comprises a threaded shaft 45 which is rotatably mounted in a recess 25b in the arm supporting face 25a of the chassis. The shaft 45 is located below the bolts 26 and extends parallel to a line connecting the centers of the bolts. The shaft is rotatably supported by web portions 25c and is held against lengthwise movement by a head 45a at one end of the shaft and a nut 45b at the other. The shaft is rotatable by means of a screw driver slot 45c in the head. An internally threaded follower 46 on the shaft has a projecting pin portion which fits into one or another of two holes 47 provided in the rear end portion 30a of the arm on opposite sides of the elongated opening 31. When it is desired to tension the belt, the nuts 26a on bolts 26 are positioned finger tight so that the arm 30 can be moved frictionally in a longitudinal direction relative to the chassis as permitted by the elongated hole 31 through which the bolts 26 extend. The shaft 45 is then rotated so as to move the follower 46 and hence the arm 30 forwardly. This moves the driven pulley 34 away from the driving pulley 22 thereby tensioning the belt 36. When a sufficient degree of tension has been reached, the couple produced by the tension on the belt and the force exerted by the follower 46 (which is located below the center line of the pulleys) exerts a force sufficient to raise the forward end of the arm slightly as permitted by play between the bolts 26 and the opening 31 in the rear end portion of the arm 30. This indicates that the belt is under sufficient tension for proper operation. The nuts 26a on the bolts 26 are thereupon tightened to secure the arm 30 in its adjusted position.

When the arm 30 is mounted in the position shown in FIG. 3, the saw blade or other tool disc 37 lies directly ahead of the engine substantially in a plane passing through the center of gravity of the engine assembly. With the arm 30 in this position, a central portion of the upper part 17c of the front handle is located approximately above the center of gravity of the tool. This provides a convenient balance for operation of the tool. When it is desired to make a horizontal cut the operator rotates the tool 90° whereupon a portion of the left hand part 17d of the front handle lies approximately above the center of gravity of the tool. Thus, the tool may be used in either a vertical or a horizontal position. When it is desired to work closer to an obstruction than is permitted by the arrangement shown in FIG. 3, the arm 30 is removed from the engine chassis and reversed so that the tool disc 37 with its guard 40 are disposed in an outboard position as shown in FIG. 4. It will be seen that in this position the tool disc lies in a plane which is offset laterally of the engine chassis. With the arm 30 in this position, the center of gravity of the tool is shifted to the right so that a different portion of the upper part 17c of the front handle 17 is disposed approximately above the center of gravity of the tool. Alternatively, the tool can be rotated 90° so that the tool disc 37 is disposed horizontally at a level below the engine chassis and hence in a position to work close to the ground or other obstruction.

The arm is readily changed from one position to the other merely by removing the nuts 26a, removing the arm from the engine chassis, rotating it 180° about its longitudinal axis, remounting the arm on the chassis and applying and tightening the nuts 26a. To facilitate putting the belt back on the driving pulley 22, the tension adjusting shaft 45 is preferably rotated so as to move the follower 46 rearwardly so as to slacken the tension on the belt. After the belt has been put on the driving pulley, its tension is readjusted as described above. It will be noted that the right hand side portion 17b of the front handle 17 is bent rearwardly as seen in FIG. 1 so as to facilitate access to the nuts 26a for removing and remounting the arm 30.

When the tool is resting on the ground or other flat surface as illustrated in FIG. 1, it is supported by the lower portion 17a of the front handle and by the guard portion 16b of the rear handle. The lower portion of the front handle together with the support 18 by which it is secured to the engine chassis lifts the front end of the chassis so that the engine chassis and the arm 30 are tilted upwardly as seen in FIG. 1. This assures that even when a tool disc 37 of maximum size intended for the tool is mounted on the shaft 32, its periphery will be clear of the ground or other surface on which the tool is resting.

While a preferred embodiment of the invention has been illustrated in the drawings and is herein particularly described it will be understood that the invention is in no way limited to the details of the illustrated embodiment.

What I claim is:

1. A hand-held power tool comprising a chassis including a motor having a drive shaft and a driving pulley on said shaft, said chassis having a rear handle and a front handle for holding said power tool, an arm projecting forwardly at one side of said chassis, said arm having a longitudinal axis, an integral flat rear end portion for attachment to said chassis and a hub portion projecting laterally on one side at the forward end of said arm, a shaft in said hub portion, bearing means rotatably supporting said shaft in said hub portion with its axis of rotation perpendicular to the longitudinal axis of said arm, a driven pulley on one end of said shaft in line with the longitudinal axis of said arm, a rotary tool disc removably secured on the other end of said shaft, a guard for said tool disc rotatably mounted on said hub portion adjacent said tool disc, means for securing said guard in selected angular position on said hub portion, upper and lower guideways for a belt extending in line with said driven pulley from the forward to the rearward end portion of said arm, said chassis having a support surface adjacent said driving pulley for receiving said arm and the integral rear end portion of said arm having like first and second flat bearing surfaces on opposite sides of the arm selectively engageable with said support surface of the chassis said like bearing surfaces being equidistant from a plane defined by said upper and lower belt guideways, means for removably securing said arm on said chassis in a first position with said first bearing surface in engagement with said support surface and with said tool disc disposed directly in front of the chassis and in a second position with said second bearing surface in engagement with said support surface and said tool disc disposed forwardly and at one side of said chassis, said belt guideways and said driven pulley being in line with said driving pulley in both said positions of said arm, and a belt running on said pulleys and in said guideways to drive said driven pulley, shaft and tool disc from said driving pulley.

2. A power tool according to claim 1, in which said arm has the cross sectional shape of a laterally opening channel comprising opposite upper and lower flange portions connected by a web portion, the depth of said channel progressively increasing from the rear end portion to the forward end portion of said arm, the channel section of said arm merging into said hub portion at the forward end of said arm.

3. A power tool according to claim 2, in which the channel section of said arm decreases progressively in depth rearwardly and merges into said essentially flat rear end portion.

4. A power tool according to claim 2, in which said hub portion has a length greater than the depth of the adjacent portion of the channel section of said arm and projects laterally beyond said adjacent portion of said channel section in a direction toward said tool disc, the projecting portion of said hub portion having a circular outer circumferential surface providing a supporting surface for said guard.

5. A power tool according to claim 2, in which said belt guideways comprise belt-receiving channels on the flanges of said arm.

6. A power tool according to claim 5, in which said channels are disposed on the outer sides of said flanges and open outwardly away from one another.

7. A power tool according to claim 1, in which said hub portion has at the end adjacent said driven pulley a flange portion extending around and protecting said pulley.

8. A power tool according to claim 1, in which said rear end portion of the arm is provided with a central longitudinally extending elongated opening and in which said securing means comprises two bolts extending through said opening and securing said arm to said chassis, further comprising means for moving said arm in a longitudinal direction to tension said belt.

9. A power tool according to claim 8, in which said means for moving said arm comprises a threaded shaft rotatably mounted on said chassis in a position adjacent, parallel to and longitudinal of said arm, an internally threaded follower on said shaft and having a portion engaged in a hole in the rear end portion of said arm, and means for manually rotating said shaft to move said follower along said shaft and thereby move said arm, said hole being below the longitudinal axis of said arm so that a forwardly directed force exerted on said arm by said follower tends to move the forward end of said arm upwardly.

10. A power tool according to claim 1, in which said chassis has a bottom with means for supporting said chassis on a horizontal surface, and in which said arm slopes forwardly and upwardly from said chassis so that when said chassis is resting on a horizontal surface said tool disc is spaced upwardly from said surface.

11. A power tool according to claim 1, in which said forward handle has a first portion approximately above the center of gravity of said power tool when said arm is in said first position and a second portion approximately above the center of gravity of said power tool when said arm is in said second position.

* * * * *